(12) United States Patent
Andersson et al.

(10) Patent No.: US 7,645,100 B2
(45) Date of Patent: Jan. 12, 2010

(54) TURNING TOOL AND A TURNING INSERT

(75) Inventors: Claes Andersson, Valbo (SE); Gunnar Jansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 135 days.

(21) Appl. No.: 11/984,068

(22) Filed: Nov. 13, 2007

(65) Prior Publication Data

US 2008/0152440 A1 Jun. 26, 2008

(30) Foreign Application Priority Data

Dec. 21, 2006 (SE) .................................. 0602809

(51) Int. Cl.
*B23B 27/00* (2006.01)
*B23B 27/16* (2006.01)

(52) U.S. Cl. ........................................ 407/66; 407/113

(58) Field of Classification Search ......... 407/113–116, 407/66, 67, 103, 104, 105, 46, 47
See application file for complete search history.

(56) References Cited

U.S. PATENT DOCUMENTS

| | | | |
|---|---|---|---|
| 3,124,866 A * | 3/1964 | Novkov | 407/4 |
| 4,674,924 A * | 6/1987 | Carlsson et al. | 407/114 |
| 5,738,468 A | 4/1998 | Boianjiu | |
| 5,810,518 A * | 9/1998 | Wiman et al. | 407/102 |
| 5,888,029 A * | 3/1999 | Boianjiu | 407/66 |
| 6,343,898 B1 * | 2/2002 | Sjoo et al. | 407/101 |
| 6,733,215 B2 * | 5/2004 | Isaksson | 407/114 |
| 7,387,474 B2 * | 6/2008 | Edler et al. | 407/113 |
| 2003/0156910 A1 * | 8/2003 | Friedman et al. | 407/117 |
| 2006/0216121 A1 * | 9/2006 | Edler et al. | 407/104 |

FOREIGN PATENT DOCUMENTS

| | | |
|---|---|---|
| DE | 297 23 558 U1 | 12/1998 |
| EP | 0 119 175 | 12/1986 |
| EP | 0 178 273 | 8/1989 |
| WO | WO 97/11806 | 4/1997 |
| WO | WO 97/16277 | 5/1997 |

* cited by examiner

*Primary Examiner*—Will Fridie, Jr.
(74) *Attorney, Agent, or Firm*—Drinker Biddle & Reath LLP

(57) ABSTRACT

A turning tool including a basic body having an insert seat, an indexable turning insert having a triangular basic shape, and a tightening element fixing the turning insert in the insert seat. The insert includes an upperside and an underside between which three side surfaces extend that are situated in a first imaginary, equilateral triangle and therefore converge in pairs at an angle of 60° toward corners in which cutting edges are included. The turning insert is engaged with the insert seat via an interface that includes elongate and straight, female-like and male-like engagement members, which are in engagement with each other in order to prevent turning of the turning insert. The insert seat includes a supporting surface having a corner section against which an active corner of the turning insert is applied. The insert seat includes a single active engagement member, which is spaced-apart from the supporting corner section, and is in engagement with one of three engagement members included in the turning insert and located in a second imaginary triangle having an equilateral shape, which is smaller than the first imaginary triangle and rotated in relation to the first imaginary triangle.

8 Claims, 5 Drawing Sheets

TURNING TOOL AND A TURNING INSERT

This application claims priority under 35 U.S.C. §119 to Swedish Patent Application No. 0602809-6, filed on Dec. 21, 2006, the disclosure of which is incorporated by reference herein in its entirety.

FIELD OF THE INVENTION

The present invention relates generally to a turning tool of the type that includes a basic body having an insert seat, and an indexable turning insert having a triangular basic shape. The insert seat includes an upperside and an underside between which there are extending three side surfaces that are situated in an imaginary, equilateral triangle and therefore converge in pairs at an angle of 60° toward corners in which cutting edges are included. The turning insert is connected to the insert seat via an interface that includes elongate and straight, female-like and male-like engagement members, which are in engagement with each other in order to prevent turning of the turning insert. The insert seat includes a supporting surface having a corner section against which an active corner of the turning insert is applied. A tightening element has the purpose of fixing the turning insert in the insert seat. The invention also relates to a turning insert as such.

Turning tools of the type generally mentioned above can be used for miscellaneous turning operations in which metallic workpieces in particular are formed by chip removing machining. The triangular turning inserts included in the tool can be divided into two main categories, viz. turning inserts having round corners or noses, for instance, for longitudinal turning, profile turning, and face turning, as well as turning inserts having teeth placed in corners for turning threads. The problems that the invention aims at solving have been observed in connection with tools for the thread turning. However, the fundamental problems as well as the solution according to the invention are generally applicable to all kinds of turning by triangular turning inserts.

BACKGROUND OF THE INVENTION

A related art, commercially available thread-chasing tool includes a basic body having an insert seat, which is delimited by a plane bottom surface and two side support surfaces, which converge at an angle of 60° toward an inner clearance space, one of which is long and forms a primary side support surface, the other one of which is shorter and forms a secondary side support surface. At each one of the three corners, the turning inserts of the tool are formed with a tooth in which the cutting edge is included. More precisely, the cutting edge includes a pair of opposite part edges in order to generate the flanks of the thread groove, and possibly also a third, central part edge in order to generate a groove bottom having a certain width. When the turning insert is fixed in the basic body by a tightening element in the form of a screw, not only the underside of the insert is kept urged against the bottom of the insert seat, but also two of the side surfaces of the insert are kept urged against the two side support surfaces of the insert seat. The urging of the turning insert against the side support surfaces is possible as a consequence of the screw being spring biased by having an inherent elasticity and being eccentrically placed in relation to the hole in the turning insert. In such a way, the screw can transfer a rectilinear motion to the turning insert, which wedges up the side surfaces of the turning insert against the converging side support surfaces of the insert seat.

When the active cutting tooth of the turning insert enters the workpiece at the entrance of the thread to be made, the workpiece is first entered by one of the part edges of the tooth, a force being applied to the turning insert, which aims to turn the insert in one of the directions of rotation around the tightening screw. As soon as the opposite part edge also has entered the workpiece so that a full thread is turned, the cutting forces on the two part edges will become essentially equally large. When the cutting tooth finally leaves the workpiece at the exit of the thread, the first part edge is detached before the other. This means that the interaction of forces is inverted so far that a force is applied to the turning insert, which aims to turn the insert in the opposite direction of rotation around the screw.

A disadvantage of the known turning tool is that the fixation of the turning insert may become unstable and unreliable, among other things as a consequence of the fact that the only active structure that, besides the tightening screw, counteracts turning of the turning insert is the two converging side support surfaces in the insert seat. Thus, the underside of the turning insert and the bottom of the insert seat are plane and smooth, and therefore they lack the capability of locking the turning insert. Considering the rule that small convergence angles give a good wedging effect, and vice versa, the convergence angle of 60° of the side surfaces of the turning insert is comparatively large. Even if the stability problems are moderate at the entering of the turning insert into the workpiece, as the cutting forces aim to turn the turning insert in such a way that the forces essentially are carried by the primary, long side support surface, the forces become marked when the turning insert leaves the workpiece and is subjected to forces that primarily are to be carried by the short, secondary side support surface. In the latter case, the risk is large that the side contact surface of the turning insert slides along the co-operating, secondary side support surface during tensioning of the tightening screw, dislodging the turning insert.

If the turning insert on and off is dislodged from the desired, predetermined position thereof, the result becomes an impaired dimensional accuracy of the thread turned. Moreover, in polar cases, breakdowns may occur.

Another disadvantage of the known turning tool is that the contact length along the primary side support surface of the insert seat and the side surface of the turning insert has to be long. This means that the freedom of the designer to form the teeth on turning inserts for turning threads significantly is limited, because the greater part of the available space is required for the side support surfaces. Hence, it follows that the teeth have to be made small.

Related art thread-chasing tools of the kind in question are disclosed in, for instance, European patent documents EP 01 19175 and EP 0178273.

U.S. Pat. No. 5,810,518 discloses a turning tool for, among other things, thread turning, which makes use of a triangular turning insert, which is mounted on the basic body via an interface that includes elongate and straight, female-like and male-like engagement members. However, in this case, the turning insert is locked in relation to the basic body via serration surfaces, which individually include a plurality of ridges and grooves, which are in engagement with each other simultaneously. In addition, the turning insert lacks support for the side surfaces of the insert. For these reasons, the manufacture of the tool is complicated, at the same time as possible form defects of the turning insert may give rise to poor machining precision of the tool.

The present invention aims at obviating the above-mentioned shortcomings of related art turning tools, and at providing an improved turning tool. Therefore, an object of the invention to provide a tool, the turning insert of which is kept stably fixed in the desired, predetermined position of the insert under varying stresses on the insert.

Another object of the invention is to provide improved stability by simple and few ways, which guarantees a continued simple and cost-effective manufacture of the turning insert as well as the basic body. Among other things, the requirements of precision in the design of the insert seat in the basic body should be moderate.

Yet another object of the invention is to increase the freedom of the designer to form space-requiring teeth having a complicated shape at the corners of the turning insert.

SUMMARY OF THE INVENTION

In an embodiment, the invention provides a turning tool including a basic body having an insert seat, an indexable turning insert having a triangular basic shape, and a tightening element fixing the turning insert in the insert seat. The insert includes an upperside and an underside between which three side surfaces extend that are situated in a first imaginary, equilateral triangle and therefore converge in pairs at an angle of 60° toward corners in which cutting edges are included. The turning insert is engaged with the insert seat via an interface that includes elongate and straight, female-like and male-like engagement members, which are in engagement with each other in order to prevent turning of the turning insert. The insert seat includes a supporting surface having a corner section against which an active corner of the turning insert is applied. The insert seat includes a single active engagement member, which is spaced-apart from the supporting corner section, and is in engagement with one of three engagement members included in the turning insert and located in a second imaginary triangle having an equilateral shape, which is smaller than the first imaginary triangle and rotated in relation to the first imaginary triangle.

In another embodiment, the invention provides an indexable turning insert, including an upperside and an underside between which three side surfaces extend that are situated in a first imaginary, equilateral triangle and therefore converge in pairs at an angle of 60° toward corners in which cutting edges are included. The underside includes three elongate and straight engagement members, which all are either female-like or male-like, and located in a second imaginary triangle having an equilateral shape, which is smaller than the first imaginary triangle and rotated in relation to the first imaginary triangle.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
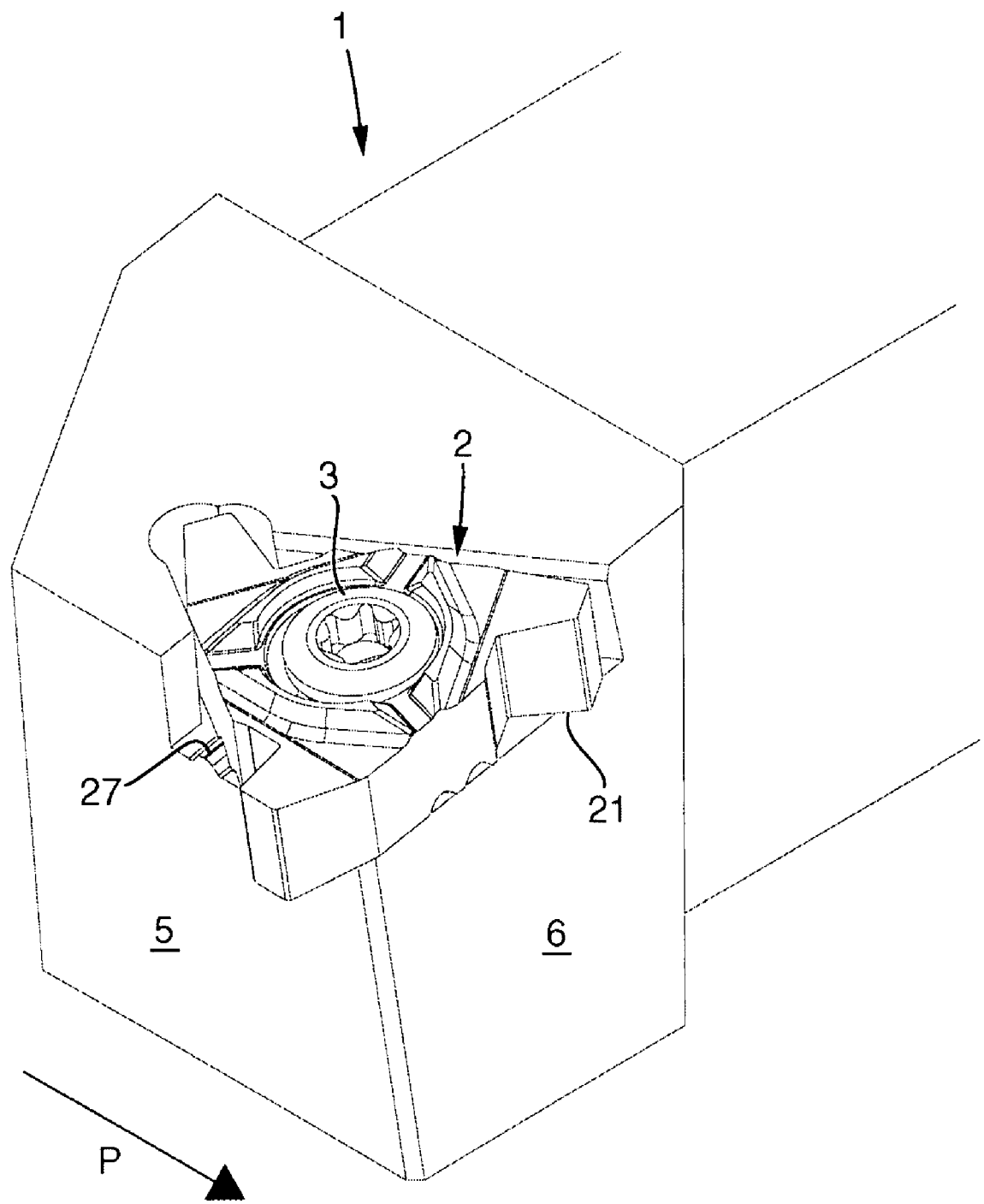
FIG. 1 is a partial perspective view of a turning tool according to an embodiment of the invention for thread turning, the tool being shown in a complete, assembled state.

The turning tool shown in the drawings includes a basic body 1 in the form of a so-called shaft holder, a turning insert 2 for turning threads, as well as a tightening element 3 in the form of a screw for the fixation of the turning insert. In the basic body 1, an insert seat, in its entirety designated 4, is formed, which opens in a front surface 5 as well as in a side surface 6 of a front head 7, which at the rear transforms into a thinner shank 8 having a polygonal cross-section shape. The insert seat 4 is delimited by a bottom surface 9 as well as by two side surfaces 10, 11, the surface 10 serving as a support or stop surface for the turning insert. The side surfaces 10, 11 converge toward an inner clearance space 12 in which an individual, inactive corner of the turning insert can be housed. In the bottom surface 9, a hole 13 mouths in which a female thread (lacking designation) is formed. The center axis of the hole 13 is designated C1.

The surface 10 is slightly inclined in relation to the bottom surface 9. In other words, the upper borderline 14 of the surface is situated closer to the center axis C1 than the lower borderline 15. The acute angle between the surfaces 9, 10 may be within the range of 88-89.5°. The length of the surface 10 is determined by the distance between the end borderlines 16, 17.

Figure 2:
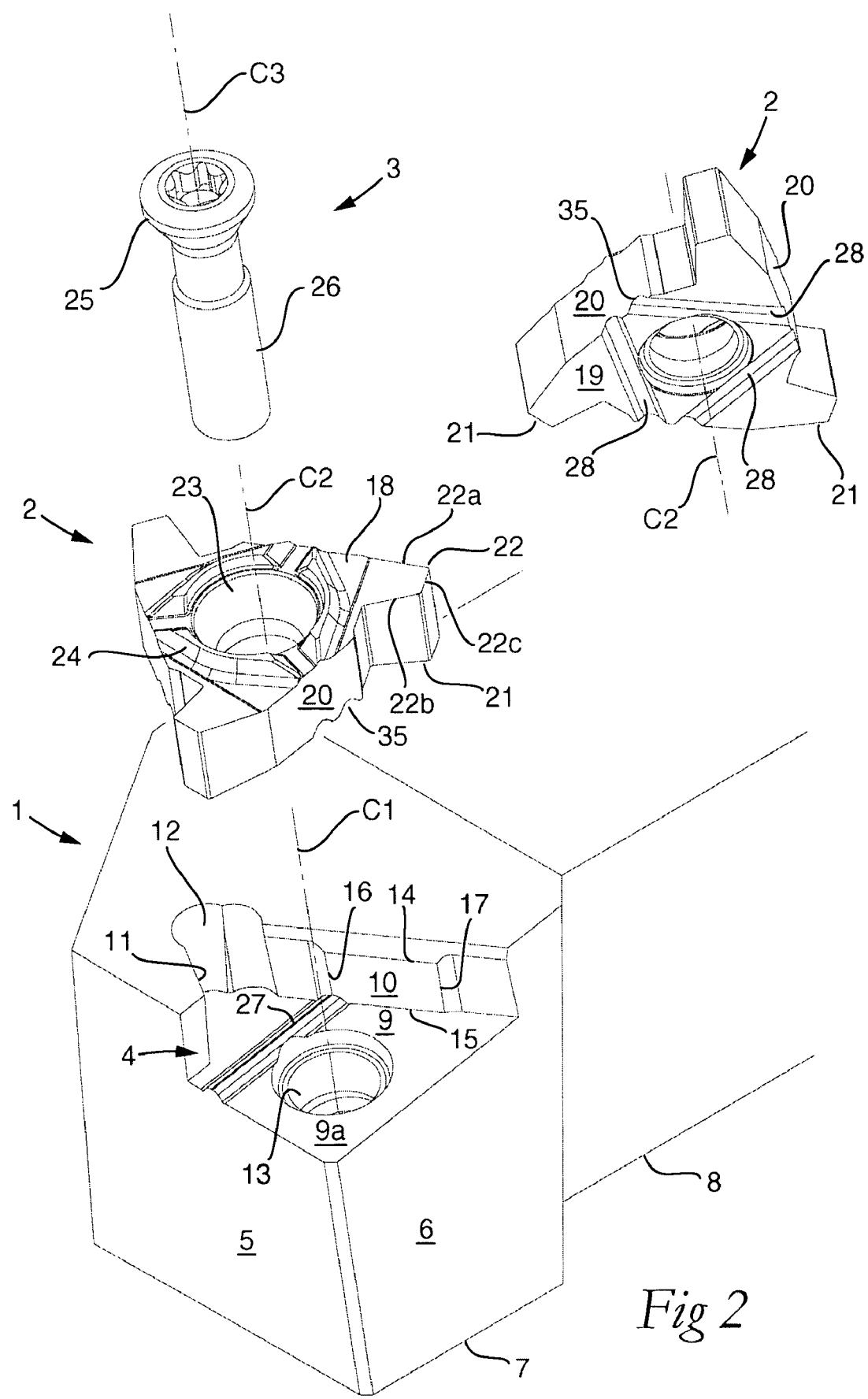
FIG. 2 is a perspective exploded view of the tool in FIG. 1, a turning insert and a tightening screw for the tool being shown spaced-apart from the basic body of the tool, and the turning insert being shown in a top perspective view as well as in a bottom perspective view.

The turning insert 2 (see FIGS. 2 and 4) has a triangular basic shape, and includes an upperside 18 and an underside 19, between which there are extending three homologous side surfaces 20 that are situated in an imaginary, equilateral triangle (designated T1 in FIG. 4) and therefore converge in pairs at an angle of 60° toward three corners. In each corner, a tooth 21 is formed having a cutting edge 22, which in this case is generally U-shaped by including three part edges, viz. two opposite flank edges 22a, 22b as well as an outer, central part edge 22c between the flank edges 22a, 22b.

The turning insert is formed with a through hole 23, the center axis of which is designated C2. Around the upper mouth of the hole, a rim 24 is formed having chip-forming part surfaces. Generally, the underside 19 of the turning insert is plane.

In this case, the tightening screw 3, the center axis of which is designated C3, includes a conical head 25 and a male thread 26 for engagement with the female thread in the hole 13.

In related art tools, both side surfaces 10, 11 projecting from the bottom surface 9 were utilized to support the turning insert, and therefore the surfaces in question had to converge at 60° like the side surfaces 20 of the turning insert. This does not need to be the case in the tool according to the invention.

Figure 5:
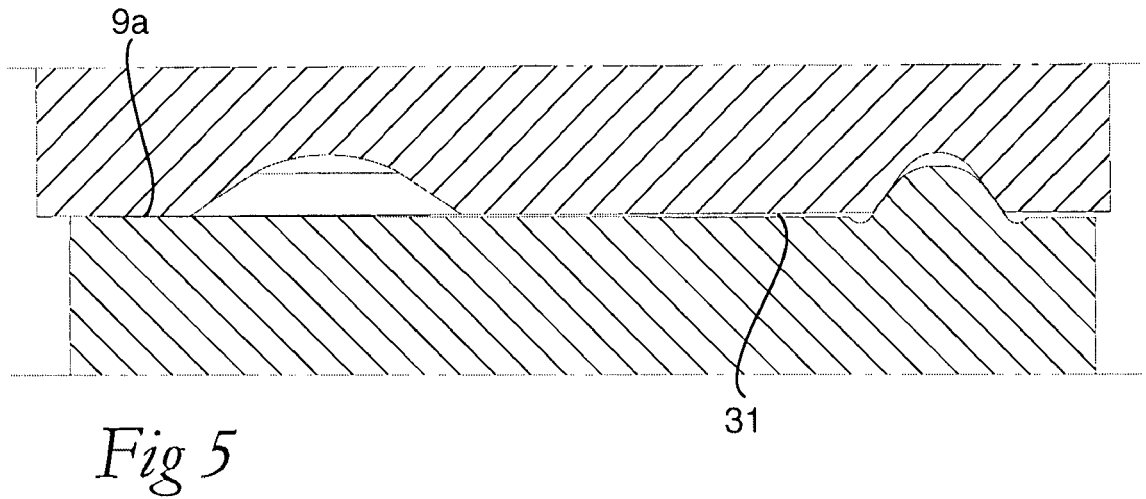
FIG. 5 is an enlarged detailed section showing the interface between the underside of the turning insert and the supporting surface of the insert seat.
Figure 6:
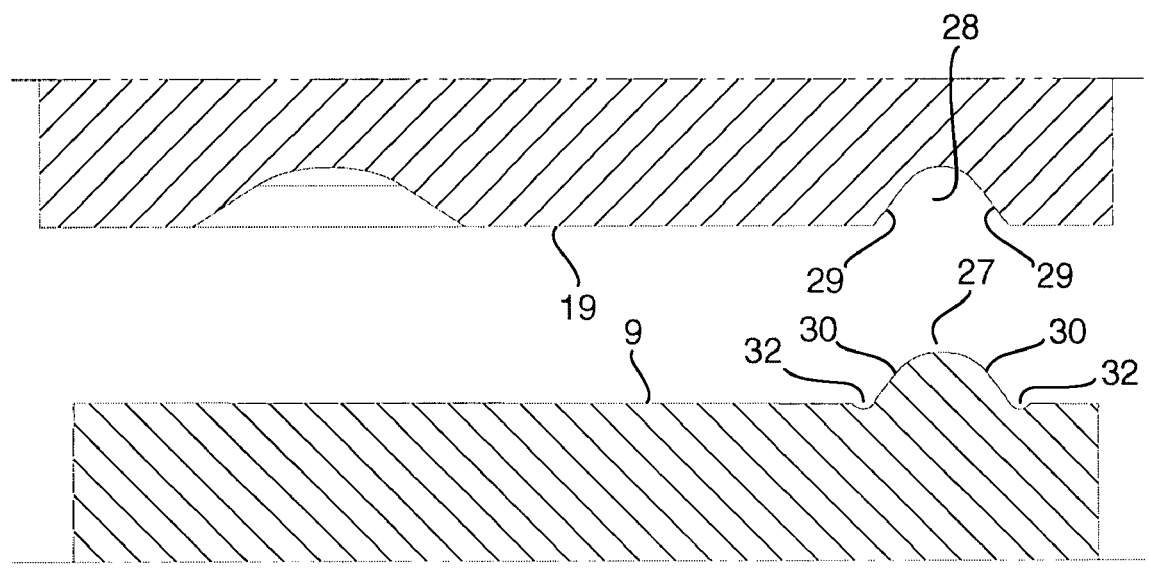
FIG. 6 is an analogous section to FIG. 5 in which the turning insert and the basic body have been separated from each other.

An elongate, straight engagement member 27 in the insert seat 4 alternately can co-operate with three likewise elongate and straight engagement members 28 included in the turning insert, one type of engagement member being male-like, and the other one female-like. In the shown embodiment, the engagement member 27 of the insert seat is male-like and is in the form of a ridge, while the three engagement members 28 of the turning insert are female-shaped and are in the form of grooves. The contact between the ridge and the individual groove takes place via pairs of flanks, which run parallel to each other. As is seen in FIG. 6, the groove 28 includes two diverging flanks 29, which are urgable against analogous, converging flanks 30 of the ridge. The crest of the ridge is convex and has a radius of curvature that is greater than the radius of curvature of the groove bottom, and therefore the ridge does not touch the bottom of the groove. In accordance with the shown embodiment, the height of the ridge 27—as defined by the level of the flanks 30 in relation to the bottom surface 9—is greater in relation to the depth of the groove 28—as defined by the level of the flanks 29 in relation to the underside 19 of the turning insert—such that the turning insert will ride on the ridge while forming a gap 31 (see FIG. 5) that tapers wedge-shapedly toward the corner section 9a of the insert seat, where the turning insert is in surface contact with the bottom surface 9. In practice, the height of the gap 31 in the area of the ridge 27 may be within the range of 0.05-0.25 mm, and advantageously amount to about 0.1 mm. Thus, although the maximal height of the gap is very limited, the gap is in practice fully sufficient to accommodate possible form defects of the turning insert, because the two plane flanks of the groove can move along the convex flanks of the ridge, at the same time that the active corners of the turning insert get a good surface contact with the bottom surface 9 of the insert seat. In other words, the function of the ridge/groove is to provide a rotary locking of the turning insert, without the ridge and the groove being subjected to the severe cutting forces that act on the forwardly indexed, active corner of the turning insert, and which is transferred via the plane underside of the turning insert to the likewise plane, supporting surface of the insert seat.

As is seen in FIG. 6, diminutive clearance chutes 32 are formed adjacent to the opposite long sides of the ridge.

Reference is now made again to FIG. 4, which illustrates how the three grooves 28 are located in a second imaginary triangle designated T2 and having an equilateral shape. More precisely, said second triangle T2 is smaller than the first triangle T1 in which the side surfaces 20 are inscribed. Furthermore, the triangle T2 is rotated in relation to the triangle T1 around the common center of the triangles, as represented by the center axis C2 of the hole 23. The rotation is illustrated by the angle α at which the groove 28 is inclined in relation to the individual side surface, e.g., 20a, that is opposite an active tooth, e.g., 21a. The angle α is acute and should be within the range of 50-90°. In the example, the angle α amounts to 60°.

Figure 4:
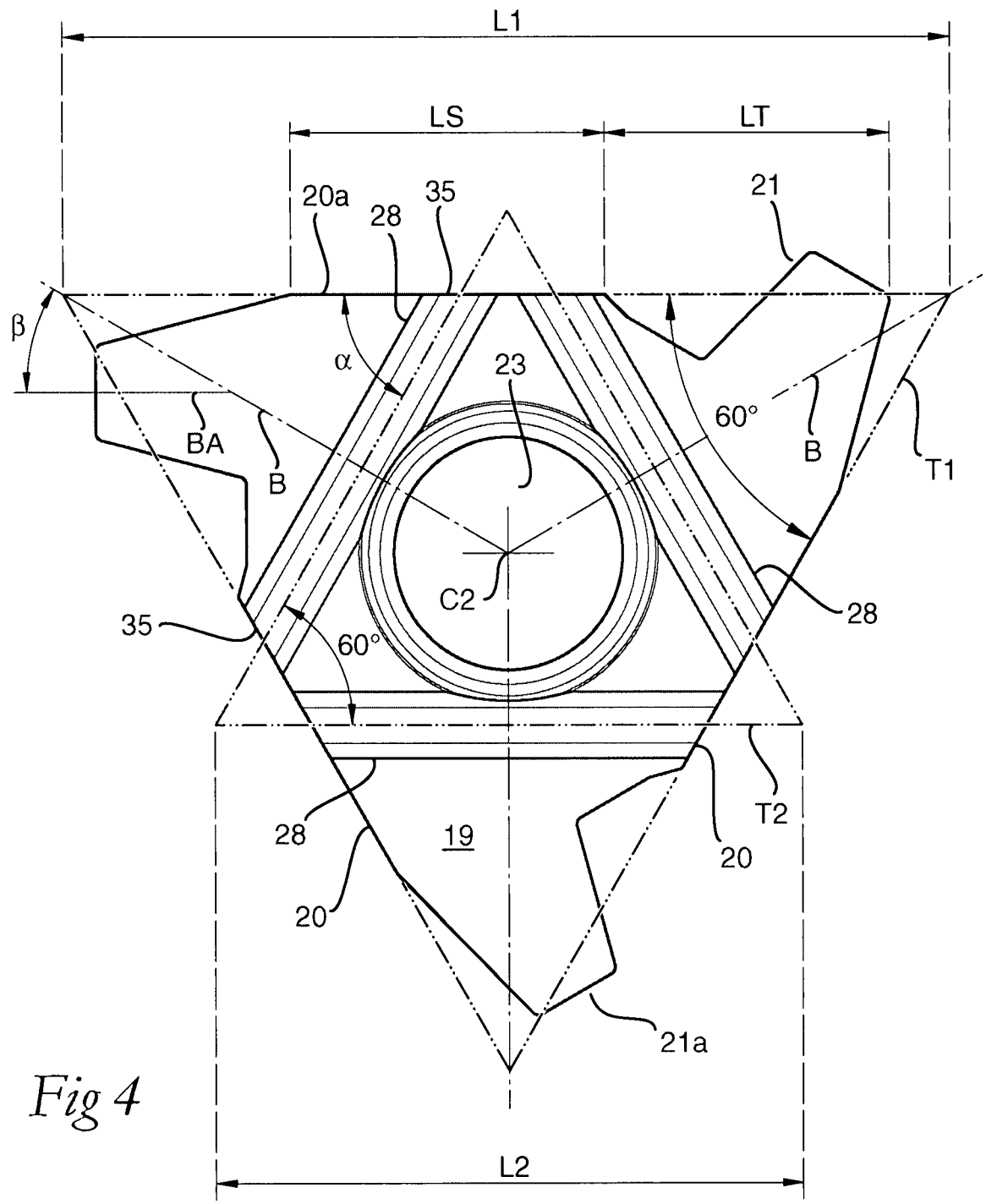
FIG. 4 is an enlarged planar view showing the underside of the turning insert.

In FIG. 4, B designates the bisector of the individual corner of the triangle T1. BA designates the bisector between the two opposite flank edges 22a, 22b of the individual cutting tooth. Mutually, the bisectors B and BA, respectively, form an acute angle β, which should be within the range of 0-45°. In the example, β amounts to 30°.

In FIG. 4, L1 designates the total length of the individual leg of the first, imaginary triangle TI, while the corresponding leg length of the triangle T2 is designated L2. Furthermore, the length of the individual side surface 20 is designated LS, while the length along the turning insert occupied by the individual cutting tooth 21 is designated LT. The side surface 20 should in practice have a length LS that is at least somewhat greater than the length of the side support surface 10 between the end borderlines 16, 17 (see FIG. 2). However, given this, the side surface 20 can only occupy a limited part of the length L1 of the triangle leg. Thus, in the example, the length LS amounts to about ⅓ of L1. In such a way, a space can be utilized for the formation of the individual cutting tooth 21, the length LT of which is approximately as great as the length LS. In other words, great freedom is given to the designer to form comparatively large teeth in the turning insert. In practice, the length LS of the side surface 20 may amount to at most 50% of the length L1 of the triangle leg.

The radial position of the individual groove 28, in relation to the center C2 of the turning insert, is determined by the length L2 of the second triangle T2 in relation to L1. In the example, L2 amounts to about 65% of L1. It is axiomatic that the grooves are spaced apart from the center C2 of the turning insert, if L2 increases in relation to L1, and vice versa. In practice, the length L2 should amount to at least 60% and at most 80% of the length L1. In such a way, it is ensured that the length of the physical grooves 28 becomes sufficiently great in order to resist the turning forces that act on the turning insert, at the same time as the flank surfaces of the grooves are not reduced to too great an extent by being intercepted by the center hole 23. However, the flanks of the grooves, in particular the inner flanks positioned closest to the center, may be partially intersected by the hole 23.

Figure 3:
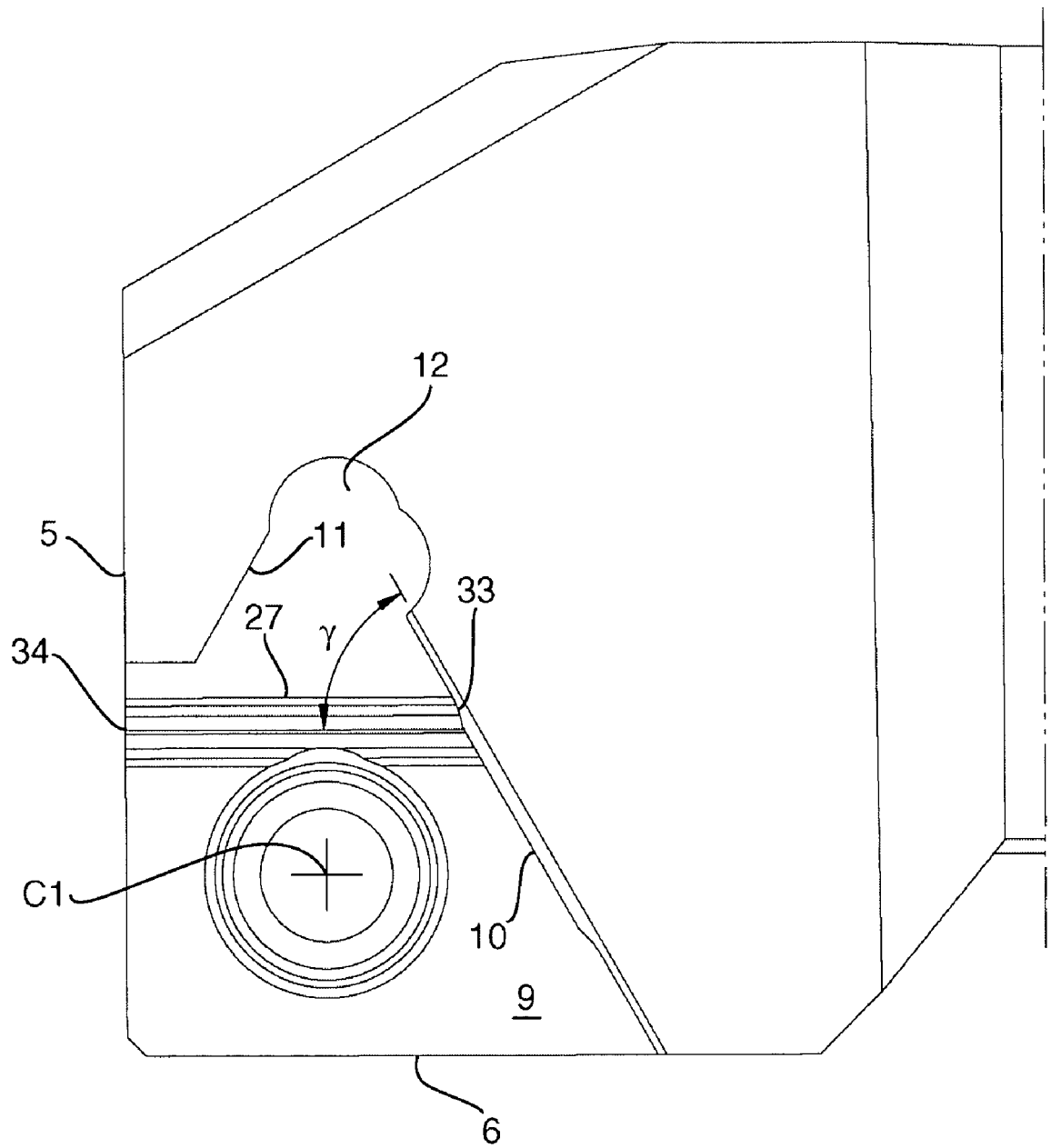
FIG. 3 is a planar view from above of an insert seat in the basic body.

In FIG. 3, it is seen that the ridge 27 and the side support surface 10 form an acute angle with each other, more precisely an acute angle γ, which essentially is as large as the angle α between the groove 28 and the side surface 20 in the turning insert.

According to an embodiment of the invention, the ridge 27 extends unbroken between two opposite ends 33, 34, one of which is situated immediately next to the side support surface 10 and the other one of which is situated flush with the front surface 5 of the basic body.

Suitably, the individual groove 28 in the turning insert also extends unbroken between opposite ends in the form of openings 35 in the side surfaces of the turning insert.

The screw 3 having the purpose of fixing the turning insert 2 is, in a conventional way, manufactured from steel, and has therefore a certain inherent elasticity. Upon the final tightening of the screw, this elasticity is utilized to apply a lateral force to the turning insert, which aims to press the turning insert against the support or the stop surface 10. For this purpose, the center axes C1 and C2 of the holes 13, 23 are eccentrically displaced in relation to each other, so that the distance between the center axis C1 and the support surface 10 is somewhat smaller than the distance between the center axis C2 and the active side surface 20 of the turning insert. In practice, the distance difference may be about some tenth of a millimeter. The effect of the relative eccentricity of the center axes is that the screw is deflected elastically during the final phase of the tightening of the screw, the head 25 of the screw pressing the turning insert toward the support surface 10. The direction of the tightening force is determined by the fact that the center axes C1, C2 are located in a vertical plane, which is parallel to the ridge 27 and the groove 28. In other words, the tightening force is directed parallel to the straight groove that is guided along the ridge.

In this connection, the turning inserts of the tool usually are manufactured from cemented carbide or another hard and wear-resistant material, while the basic body—like the tightening screw—are manufactured from steel or the like. The turning insert may either be ground or directly pressed, i.e., unground.

When the turning insert is to be mounted, the insert is let down into a position in which the ridge 27 engages one of the three grooves 28 in the underside of the turning insert. Next, the screw 3 is applied with the male thread 26 in engagement with the female thread of the hole 13. During the final phase of the tightening of the screw, the forwardly indexed corner of the turning insert is pressed against the corner section of the bottom surface 9 at the same time as a lateral force is applied to the turning insert, which displaces the insert along the ridge 27 until the rear side surface 20 of the turning insert is pressed in close contact against the support surface 10. Because the support surface 10 forms a moderate acute angle with the supporting bottom surface 9, the contact is established at least initially along the upper portions of the surfaces 10, 20. In the final, stably fixed position of the turning insert, the turning insert is not in contact with the surface 11. The wedge-shaped material portion in which the surface 11 is included therefore serves as a protection for the inactive cutting tooth that is housed in the space 12.

A fundamental advantage of the turning tool according to the invention is that the turning insert is fixed in a stable and reliable way so that the insert can resist, among other things, such alternately arising cutting forces that aim to turn the turning insert sometimes clockwise and sometimes counter-clockwise around the tightening screw. As a consequence of the co-operating male and female members of the interface between the turning insert and the basic body providing a desired rotary locking of the turning insert, the only active side support surface for the turning insert can be given a length that is considerably reduced in relation to the length of the corresponding side support surface in related art tools. Thus, the side support surface in the tool according to the invention serves primarily as a stop for the turning insert. This means that the co-operating side contact surface of the turning insert can be made with moderate length (LS). In such a way, a comparatively large space (LT) can be utilized for the formation of the teeth of the turning insert.

The invention is not limited only to the embodiments described above and shown in the drawings. Thus, the invention is applicable to any turning tool of the type that makes use of indexable, triangular turning inserts. In other words, at the three corners thereof, the turning inserts can be formed with traditional, round noses instead of teeth for the thread turning. Furthermore, the described insert seat could be included in a shim plate or attachment, which in turn, in a suitable way, is fixed in relation to the basic body. In this connection, the side support surface serving as a stop for the turning insert could be formed in the shim plate, instead of in the basic body. Neither the ridge nor the grooves in the described interface need to extend unbroken all the way between opposite ends. Thus, for instance, the ridge could be replaced by a plurality of knobs of limited length situated in a line one after the other. However, for reasons of manufacturing technique, the exemplified, unbroken ridge is preferred. As regards the individual groove, the length thereof could be reduced by the fact that the groove is terminated without mouthing in the side surfaces of the turning insert. In addition, the flanks of the groove may be convex and the flanks of the ridge be plane. Furthermore, the fixation of the turning insert may be effected by tightening elements other than screws, e.g., clamps, wedges or the like. Also, the turning insert may be made invertable by being formed with three engagement members on the underside as well as the upperside. Although it is preferred to provide the turning insert with female-shaped engagement members (in the form of grooves) and the insert seat or shim plate with a male-shaped member, also the opposite alternative is possible. In other words, the turning insert could be formed with three alternately usable ridges and the insert seat or shim plate with one active groove. However, in such cases, the insert seat or shim plate would need to be supplemented with two wide grooves in order to accommodate the two inactive ridges of the turning insert.

The described tool can be utilized for chasing not only by the fact that the workpiece is rotated in relation to the tool in order to bring about the requisite relative motion, but also in the reversed way, i.e., by rotation of the tool in relation to a non-rotating workpiece (irrespective of whether the workpiece or the tool is axially fed).

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A turning tool comprising:
   a basic body having an insert seat;
   an indexable turning insert having a triangular basic shape; and
   a tightening element fixing the turning insert in the insert seat;
   the insert including an upperside and an underside between which three side surfaces extend that are situated in a first imaginary, equilateral triangle and therefore converge in pairs at an angle of 60° toward corners in which cutting edges are included;
   the turning insert being engaged with the insert seat via an interface that includes elongate and straight, female-like and male-like engagement members, which are in engagement with each other in order to prevent turning of the turning insert;
   the insert seat including a supporting surface having a corner section against which an active corner of the turning insert is applied;
   wherein the insert seat includes a single active engagement member, which is spaced-apart from the supporting corner section, and is in engagement with one of three engagement members included in the turning insert and located in a second imaginary triangle having an equilateral shape, which is smaller than the first imaginary triangle and rotated in relation to the first imaginary triangle.

2. The turning tool according to claim 1, wherein the depth of the individual, female-shaped engagement member is smaller than the height of the male-shaped engagement member such that a gap is formed between the underside of the turning insert and the supporting surface of the insert seat, the gap tapering wedge-shapedly toward the corner section, where the turning insert rests in surface contact with the supporting surface.

3. The turning tool according to claim 1, wherein the individual female member is a groove formed with two diverging flanks and included in a series of three grooves in the underside of the turning insert.

4. The turning tool according to claim 3, wherein the male member is a ridge projecting from the supporting surface of the insert seat and having two opposite, converging flanks.

5. The turning tool according to claim 3, wherein the flanks of the ridge are convex, and the flanks of the groove plane.

6. The turning tool according to claim 1, wherein the engagement member included in the insert seat extends at an acute angle ($\gamma$) within the range of 50-90° to a side support surface for the turning insert, and an individual engagement member included in the turning insert extends at an equally large acute angle ($\alpha$) to a side surface of the insert.

7. The turning tool according to claim 1, wherein legs of the second triangle have a length that is at least 60% and at most 80% of the leg length of the first triangle.

8. The turning tool according to claim 1, wherein the side surface of the turning insert has a length that is at most 50% of the length of a leg of the first triangle.

* * * * *